(12) United States Patent
Vitale et al.

(10) Patent No.: US 8,727,426 B2
(45) Date of Patent: May 20, 2014

(54) EXPANDABLE VEHICLE SYSTEM AND METHOD OF EXPANDING A VEHICLE

(75) Inventors: Robert L. Vitale, Macomb Township, MI (US); Christopher E. Borroni-Bird, Oakland Township, MI (US); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 13/421,923

(22) Filed: Mar. 16, 2012

(65) Prior Publication Data

US 2013/0241236 A1 Sep. 19, 2013

(51) Int. Cl.
B62D 21/14 (2006.01)

(52) U.S. Cl.
USPC .................................. 296/193.04; 296/26.08

(58) Field of Classification Search
USPC .......................................... 296/193.04, 26.08
See application file for complete search history.

(56) References Cited

U.S. PATENT DOCUMENTS

| | | | | |
|---|---|---|---|---|
| 1,875,214 | A | * | 8/1932 | Buderus ........................ 105/4.1 |
| 2,128,930 | A | * | 9/1938 | Fageol et al. ................. 180/291 |
| 2,251,584 | A | * | 8/1941 | Fageol et al. ................. 280/403 |
| 2,407,007 | A | * | 9/1946 | Henrichsen ................... 180/420 |
| 2,425,948 | A | * | 8/1947 | Lucien ............................ 180/11 |
| 2,843,417 | A | * | 7/1958 | Wahl et al. .................... 280/403 |
| 2,865,306 | A | * | 12/1958 | Bock et al. ........................ 105/3 |
| 3,169,792 | A | * | 2/1965 | Viquez ......................... 296/99.1 |
| 4,351,404 | A | * | 9/1982 | Igarashi ....................... 180/14.1 |
| 4,361,200 | A | * | 11/1982 | Igarashi ....................... 180/14.4 |
| 4,368,793 | A | * | 1/1983 | Igarashi ....................... 180/14.4 |
| 4,596,192 | A | * | 6/1986 | Forster .......................... 104/307 |
| 4,676,545 | A | * | 6/1987 | Bonfilio et al. ........... 296/193.04 |
| 4,842,326 | A | * | 6/1989 | DiVito ..................... 296/193.04 |
| 4,848,831 | A | * | 7/1989 | Buday ........................... 296/165 |
| 4,887,859 | A | * | 12/1989 | Aper .......................... 296/26.08 |
| 4,995,664 | A | * | 2/1991 | Buday ........................... 296/165 |
| 6,227,125 | B1 | * | 5/2001 | Schroeder et al. ............ 105/401 |
| 6,490,980 | B1 | * | 12/2002 | Mosby .......................... 105/397 |
| 6,896,319 | B1 | * | 5/2005 | Huang et al. ............. 296/193.04 |
| 6,971,707 | B1 | * | 12/2005 | Mullan ......................... 296/172 |
| 7,922,238 | B2 | * | 4/2011 | Ische ....................... 296/193.04 |
| 2006/0049652 | A1 | * | 3/2006 | Martin ....................... 296/26.08 |
| 2007/0052261 | A1 | * | 3/2007 | Andre et al. ............. 296/193.04 |
| 2010/0276970 | A1 | * | 11/2010 | Lorenzo et al. .......... 296/193.04 |

FOREIGN PATENT DOCUMENTS

DE 3336014 A1 * 4/1985

* cited by examiner

*Primary Examiner* — H Gutman
(74) *Attorney, Agent, or Firm* — Quinn Law Group, PLLC (57) ABSTRACT

An expandable vehicle system includes a drivable vehicle having a first propulsion system, a first set of wheels, and a first body supported by the first set of wheels. The first body at least substantially encloses and defines a first interior compartment. An extension unit has a second body and at least one wheel supporting the second body. The second body at least partially defines a second interior compartment. The first body is configured with a first attachment interface and the second body is configured with a second attachment interface. The first and second attachment interfaces are cooperatively configured to attach to one another such that the drivable vehicle is mechanically-coupled to the extension unit to form an expanded vehicle drivable by the drivable vehicle and with the first interior compartment contiguous with the second interior compartment.

17 Claims, 6 Drawing Sheets

EXPANDABLE VEHICLE SYSTEM AND METHOD OF EXPANDING A VEHICLE

TECHNICAL FIELD

The present teachings generally include a drivable vehicle that can be selectively expanded and a method of expanding a vehicle.

BACKGROUND

An individual may have different mobility needs on different occasions. For example, the individual may work in an urban area and need to commute to work on a daily basis. For these commuting needs, a fuel efficient vehicle that seats at least the driver and is of a small size that is easy to maneuver and park in a congested area is ideal. On other occasions, the driver may need to transport one or more additional passengers or cargo, may need or desire a higher performance vehicle, or may need to travel a further distance than the typical commute to and from work. Heretofore, the driver would need to use a different vehicle for these occasions.

SUMMARY

An expandable vehicle system is provided that includes a drivable vehicle that is modifiable to meet the requirements of different excursions, enabling fuel efficiency, performance, and seating and cargo capacity as needed. Specifically, the drivable vehicle includes a vehicle body defining and at least partially enclosing an interior compartment. The drivable vehicle includes at least one wheel supporting the vehicle body. The vehicle body has an attachment interface configured for mechanical attachment to another vehicle body to expand the interior compartment. A wheel base partially defined by the at least one wheel of the drivable vehicle may also be greater when the other vehicle body is attached.

In one embodiment, the drivable vehicle has a first propulsion system, a first set of wheels, and a first body supported by the first set of wheels. The first body at least substantially encloses and defines a first interior compartment. The expandable vehicle system includes an extension unit that has a second body and may have at least one wheel supporting the second body. The second body at least partially defines a second interior compartment. The first body is configured with a first attachment interface and the second body is configured with a second attachment interface. The first and second attachment interfaces are cooperatively configured to attach to one another such that the drivable vehicle is mechanically-coupled to the extension unit to form an expanded vehicle that is drivable by the drivable vehicle and has the first interior compartment contiguous with the second interior compartment.

Different mobility needs arising on different occasions are thereby met with the vehicle system. For example, when a fuel efficient vehicle is needed for one person to travel a relatively short distance, the drivable vehicle alone may be used. If more passengers or cargo need to be transported, the extension unit can be attached. Optionally, the extension unit may have a second prolusion system that is operatively connectable to the first propulsion system when the extension unit is attached to the drivable vehicle. This would allow the drivable vehicle to travel further distances, or have increased performance when needed.

Accordingly, a method of expanding a drivable vehicle includes attaching a first body of a drivable vehicle to a second body of an extension unit supported on at least one wheel to form an expanded vehicle with an interior compartment of the drivable vehicle that is contiguous with an interior compartment of the extension unit. The method then includes driving the drivable vehicle with the first body attached to the second body. To meet the needs of another excursion, the method includes detaching the second body from the first body; and driving the drivable vehicle without the extension unit.

The above features and advantages and other features and advantages of the present teachings are readily apparent from the following detailed description of the best modes for carrying out the present teachings when taken in connection with the accompanying drawings.

DETAILED DESCRIPTION

Figure 1:
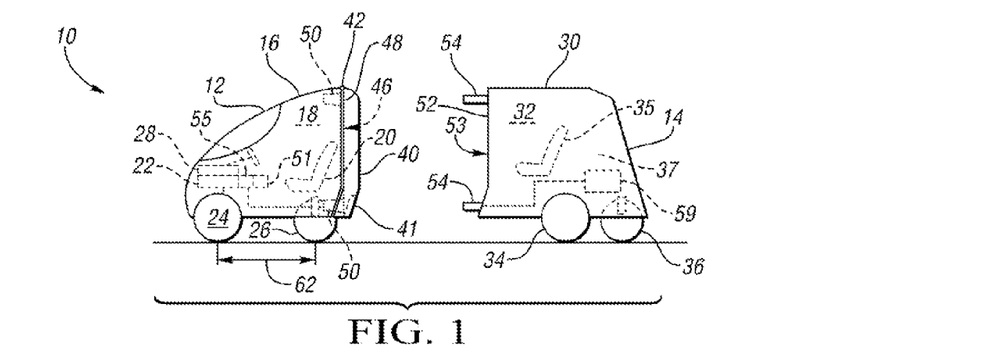
FIG. 1 is a schematic side view illustration of a first embodiment of an expandable vehicle system in exploded view showing a drivable vehicle and an extension unit detached from the drivable vehicle.
Figure 2:
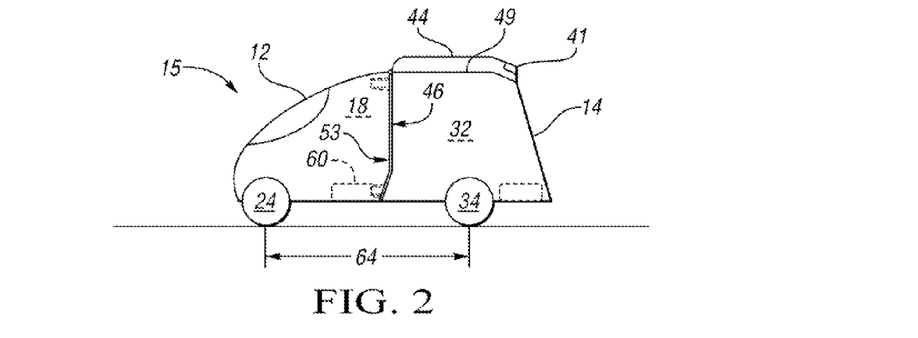
FIG. 2 is a schematic side view illustration of the expandable vehicle system of FIG. 1 with the extension unit attached to the drivable vehicle to form an expanded vehicle.

Referring to the drawings, wherein like reference numbers refer to like components throughout the several views, FIG. 1 shows a first embodiment of an expandable vehicle system 10 that includes a drivable vehicle 12 that is drivable as a relatively compact, stand-alone vehicle, and is selectively attachable to an extension unit 14 to form an expanded vehicle 15 as shown in FIG. 2. The drivable vehicle 12 has a first body 16 that substantially defines and encloses a first interior compartment 18 that includes a passenger compartment with at least one vehicle seat 20. The drivable vehicle 12 also includes a first propulsion system 22 and a first set of wheels 24, 26 that are operatively connected to the first propulsion system 22. The first set of wheels 24, 26 includes a pair of front wheels 24 (only one of which is visible in the side view shown) and at least one rear wheel 26. Although illustrated as being approximately the same size as front wheels 24, the rear wheel 26 may instead be smaller or larger than front wheels 24. A steering system 28 is operatively connected to the front wheels 24. The drivable vehicle 12 is referred to as "drivable" because it has both a propulsion system 22 and a steering system 28 to propel and steer the wheels 24. As used herein, an "interior compartment" includes the space surrounded by the vehicle body, including a passenger compartment if seating is provided, and any cargo area within the interior compartment.

The extension unit 14 has a second body 30 that substantially defines a second interior compartment 32. The extension unit 14 also has a second set of wheels 34, 36 that includes a pair of wheels 34 (only one of which is visible in the side view shown) as well as a rear wheel 36. Although illustrated as being approximately the same size as front wheels 34, the rear wheel 36 may instead be smaller or larger than front wheels 34. The rear wheel 36 is used to balance the extension unit 14 when it is detached from the drivable vehicle 12, as shown in FIG. 1. The extension unit 14 may have at least one additional seat 35 with added cargo area 37 rearward of the seat 35, or may have no additional seats for an even larger added cargo area.

Figure 5:
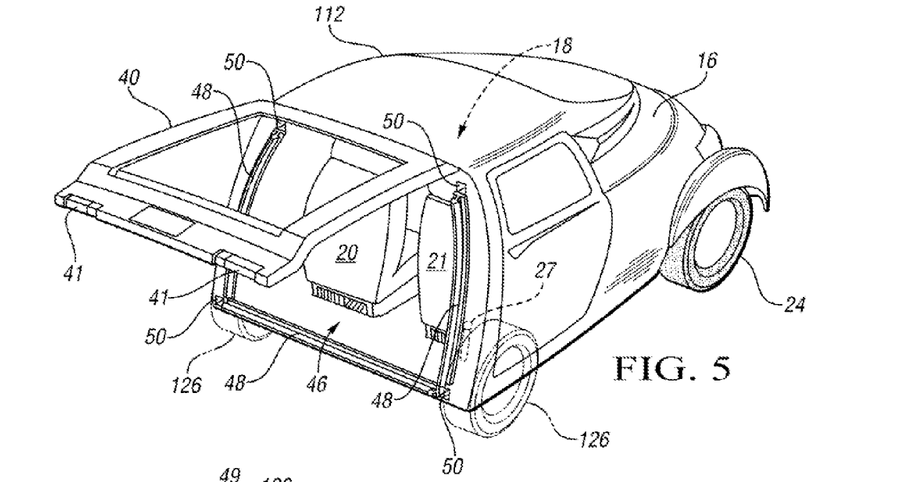
FIG. 5 is a schematic illustration in perspective view of a second embodiment of a drivable vehicle.

The vehicle body 16 of the drivable vehicle 12 has a lift gate 40 connected to the remainder of the body 16 at a hinge 42. The lift gate 40 is moveable from a closed position shown in FIG. 1 to an open position indicated at 44 in FIG. 2. The lift gate 40 is designed to over-swing the open position and then be lowered slightly onto the roof portion 49 to the open position. The lift gate 40 may have rear lights 41, including running lights, turn lights and brake lights, that are configured to be viewable from the rear both when the lift gate 40 is in the closed position and in the open position. The extension unit 14 may have a duplicate license plate on a rear face that is visible when the extension unit 14 is attached to the drivable vehicle 12, as the license plate attached to the lift gate 40 will not be visible from the rear when the lift gate 40 is in the open position. In the closed position, the lift gate 40 closes an opening 46 defined by the body 16, not visible in the side view of FIG. 1, but similar to a hatch opening as shown in the embodiment of FIG. 5 and as will be well understood by those skilled in the art. The body 16 has a first attachment interface 48 that surrounds the opening 46. The first attachment interface 48 includes structure that forms tapered cavities 50, shown in phantom in FIG. 1, that are spaced from one another at a predetermined spacing. Four cavities 50 are shown spaced in a predetermined spacing to form a square shape in FIG. 5.

The extension unit 14 has a second attachment interface 52 that includes tapered extension posts 54 that are spaced from one another at the same predetermined spacing as the tapered cavities. The attachment interface 52 surrounds an opening 53 of the extension unit 14. The tapered cavities 50 are configured to receive the extension posts 54 so that the drivable vehicle 12 is mechanically-coupled to the extension unit 14. The tapered design of the cavities 50 and the extension posts 54 aids in alignment assistance when inserting the extension posts 54. It should be understood that the first attachment interface 48 with cavities 50 could instead be on the extension unit and the second attachment interface 52 with extension posts 54 could instead be in the drivable vehicle 12.

Figures 6, 7, 8:
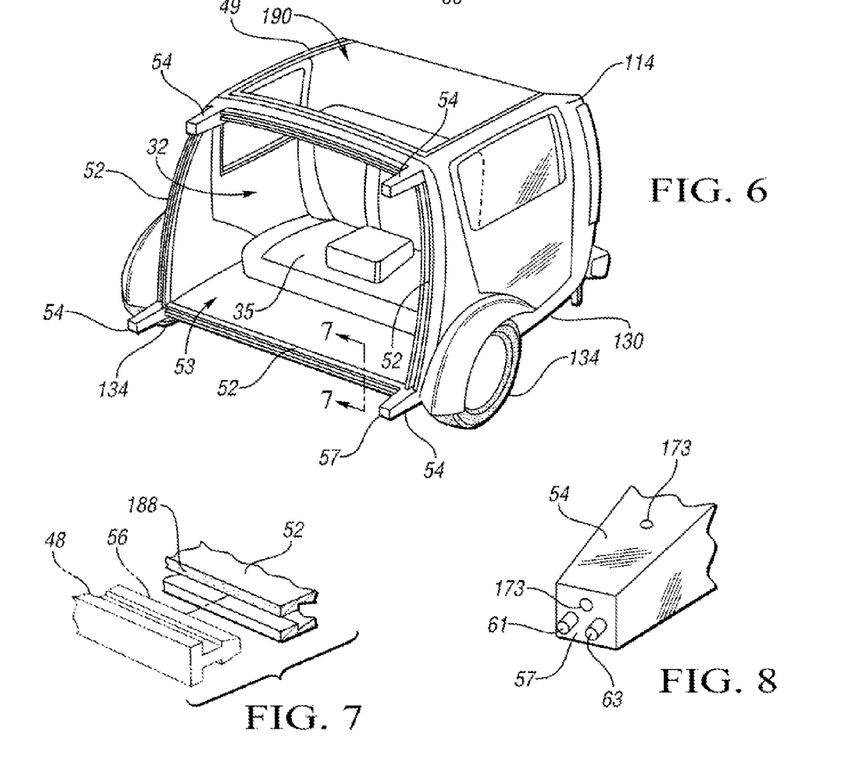
FIG. 6 is a schematic illustration in perspective view of the front of a second embodiment of an extension unit for use with the drivable vehicle of FIG. 5.
FIG. 7 is a schematic illustration in partial cross-sectional view of a portion of the second attachment interface of FIG. 4 taken at the arrows 7-7 in FIG. 6 and showing the second attachment interface of the drivable vehicle of FIG. 5 in phantom.
FIG. 8 is a schematic illustration in fragmentary perspective view of an extension post portion of the second attachment interface of FIG. 6.

At least one of the extension posts 54 may include an electrical interface 57 with electrical system conductors or control system conductors so that the electrical system 55 of the drivable vehicle 12 is operatively connected to the electrical system of the extension unit 14 and a control system 51 of the drivable vehicle 12 is operatively connected to components in the extension unit 14, as further described with respect to FIG. 8. The electrical interface 57 may include a control area network (CAN) bus 61 with connections for information and entertainment systems as well as safety systems, as well as a power bus 63. For example, the CAN bus 61 may communicate propulsion control signals, excess power sharing signals, and brake control commands to the extension unit 14.

In this manner, if the extension unit 14 includes an optional second propulsion system 59, shown in FIG. 1 and referred to as an auxiliary power unit, the control system 51 can cooperatively control both the first propulsion system 22 and the second propulsion system 59 to propel the expanded vehicle 15. The second propulsion system 59 may be a small hybrid system that is self-powered by an energy storage unit and has separate onboard controls that communicate with the control system 51 of the drivable vehicle 12 through the CAN bus 61 of the electrical interface 57. By way of nonlimiting example, the first propulsion system 22 may be an electric-only propulsion system, including an energy storage device, such as a battery, and one or more electric motor/generators, so that the drivable vehicle 12, when driven without the extension unit 14, is a battery electric vehicle. The second propulsion system 59 may include an additional energy storage device to provide an extended range for the propulsion system 22, or may be an internal combustion engine, fuel cell, or other type or power source.

Figure 4:
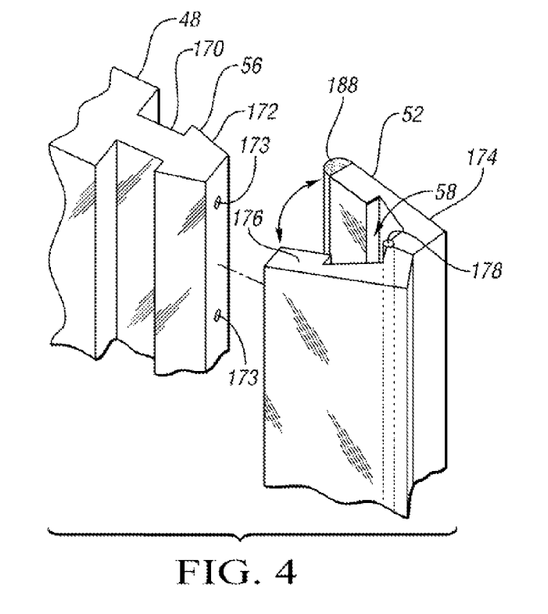
FIG. 4 is a schematic illustration in perspective and exploded view of a first attachment interface of the drivable vehicle of FIGS. 1 and 2 and the second attachment interface of the extension unit in partial fragmentary view.

As shown in FIG. 2, the interior compartment 18 is contiguous with the interior compartment 32 of the extension unit 14. The opening 46 and the opening 53 are positioned contiguous to one another when the attachment interfaces 48, 52 are connected. As shown in FIG. 4, the first attachment interface 48 may also include one or more shaped projections 56 configured to be captured within one or more shaped recesses 58 of the second attachment interface 52, as further described with respect to the embodiment of FIGS. 5-11. Pressure sensors 173 may be placed between the attachment interfaces 48, 52 to determine the pressure between the attached first body 16 and second body 30. Ideally, the pressure sensors 173 will all indicate a uniform pressure to ensure uniform sealing. In FIG. 4, the pressure sensors 173 are shown at an end face of the shaped projection 56 of the first attachment interface 48. Electrical conductors, not shown, extend through the first attachment interface 48 and connect from the pressure sensors 173 to the control system 51 shown in FIG. 1. Pressure sensors 173 may also be used on the end face of the extension posts 54 or the sides of the extension posts 54, as shown in FIG. 8. Alternatively, pressure sensors may be placed on the second attachment interface 52 within the recess 58.

When the lift gate 40 is in the second position 44, it mates to a roof portion 49 of the second body 14 as shown in FIG. 2. The lift gate 40 is considered "mated" to the roof portion 49 as a surface of the lift gate 40 follows a surface of the roof portion 49. Furthermore, the lift gate 40 may be sealingly and mechanically-coupled to the roof portion 49 with attachment interfaces similar to attachment interfaces 48, 52. A weather seal may surround the perimeter of the lift gate 40 to sealingly contact the roof portion 49.

Figure 10:
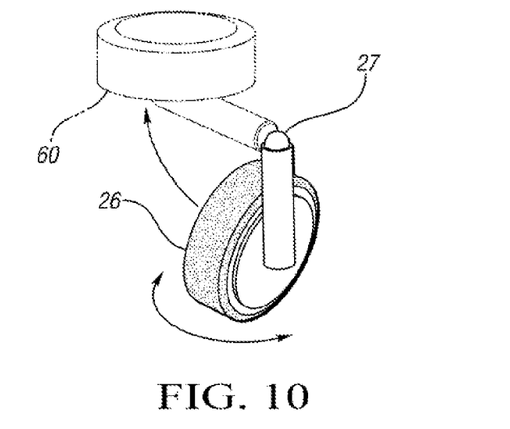
FIG. 10 is a schematic illustration of a pivotable wheel of the extension unit of FIG. 9 showing the wheel in a use position for supporting the extension unit and showing the wheel in phantom in a stowed position.

When the drivable vehicle 12 is attached to the extension unit 14, the wheels 26 and 36 may be pivoted upward at lockable ball joints 27 to stowed positions, as shown with respect to wheel 26 in FIG. 10, with the stowed position shown in phantom. When the drivable vehicle 12 is detached from the extension unit 14 and is driven separately from the extension unit 14, it has a wheel base 62 between the front wheels 24 and the wheel or wheels 26, as shown in FIG. 1. When the extension unit 14 is mechanically-coupled to the drivable vehicle 12 at the attachment interfaces 48, 52, and the wheels 26, 36 pivoted to stowed positions, the expanded vehicle has a larger wheel base 64 between the front wheels 26 and the wheels 34 of the extension unit 14.

Figure 11:
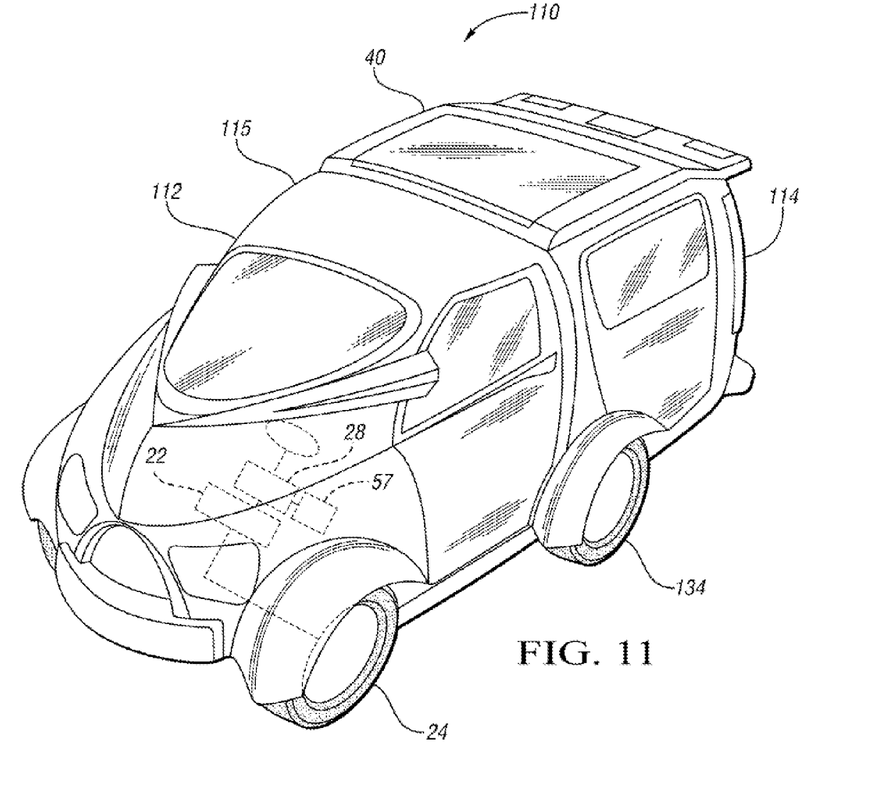
FIG. 11 is a schematic perspective illustration of an expanded vehicle having the drivable vehicle of FIG. 5 attached to the extension unit of FIG. 6.

FIGS. 5-11 show a second embodiment of an expandable vehicle system 110 that includes a drivable vehicle 112 (FIG. 5) and an extension unit 114 (FIG. 6) attachable to the drivable vehicle 112 to form an expanded vehicle 115 (FIG. 11). The expandable vehicle system 110 has the first and second attachment interfaces 48, 52 of FIGS. 1-4. Components substantially identical to those of the expandable vehicle system 10 of FIGS. 1-4 are referred to with the same reference numbers. The drivable vehicle 112 includes two pivotable wheels 126 each of which is pivotable laterally inboard similar to wheel 26 of FIG. 10 to stowed positions when the drivable vehicle 112 is attached to the extension unit 114. Although illustrated as being approximately the same size as front wheels 24, the wheels 126 may instead be smaller or larger than front wheels 24. The extension unit 114 has a pair of wheels 134 (one visible) and the rear wheel 36 described with respect to FIG. 1 and pivotable as shown with respect to wheel 26 in FIG. 10. Although illustrated as being approximately the same size as wheels 134, the rear wheel 36 may be larger or smaller than wheels 134.

The drivable vehicle 112 has two seats 20, 21. The drivable vehicle 112 may be a front wheel-drive vehicle with limited speed and range. The drivable vehicle 112 is shown with two side doors and the lift gate 40. The first attachment interface 48 is shown as a three-position attachment interface, having three like extensions of projections 56 along the vertical and lower portions of the body 16 surrounding the opening 46. As best shown in FIG. 4, the projections 56 have a relatively narrow neck portion 170 and an angled head portion 172.

Figure 3:
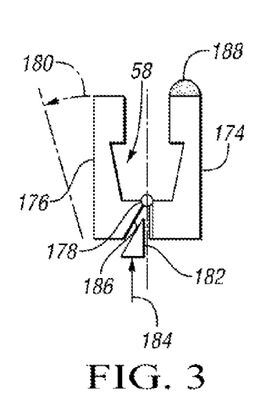
FIG. 3 is a schematic side view illustration of a second attachment interface of the extension unit of FIGS. 1 and 2.

The second attachment interface 52 includes three unitary strips having a first portion 174 and a second portion 176 hinged to the first portion along an axial hinge 178 at which the second portion 176 is pivotable in a direction 180 away from the first position 174 from a first portion shown in FIG. 3 to a second position shown in FIG. 4. When in the first position of FIG. 3, each strip of the second attachment interface 52 forms a recess 58 configured to fit to the corresponding projection 56 of the first attachment interface 48 so that inner surfaces of the second attachment interface 52 at the recess 58 contact the outer surfaces of the projection 56. By pivoting the second portion 176 to the open position, the projection 56 can be easily received between the portions 174, 176. The portion 176 is then moved to the first position to define the recess 58 in which the projection 56 is captured.

A wedge-like locking mechanism 182 can then be moved in a direction 184 to fit into an additional cavity that is a crevice 186 defined between the portions 174, 176 to lock the projection 56 in the recess 58 and thereby mechanically-couple the drivable vehicle 112 to the extension unit 114. The portion 176 and the crevice 186 are positioned to be accessible to a user attaching the extension unit 114 to the drivable vehicle 112. It should be understood that other means of locking the attachment interfaces 48, 52 to one another may be used, and the attachment interfaces themselves may have any complementary shapes. A weather seal 188 is secured to the first portion 174 and extends along the length of the first portion 174 to help seal the opening 46 when the first and second attachment interfaces 48, 52 are coupled to one another. Additional seals may be placed within the recess 58. The drivable vehicle 12 is also coupled to the extension unit 14 with the same attachment interfaces 48, 52 as is the drivable vehicle 212 and the extension unit 214 of FIGS. 12-15.

Figure 9:
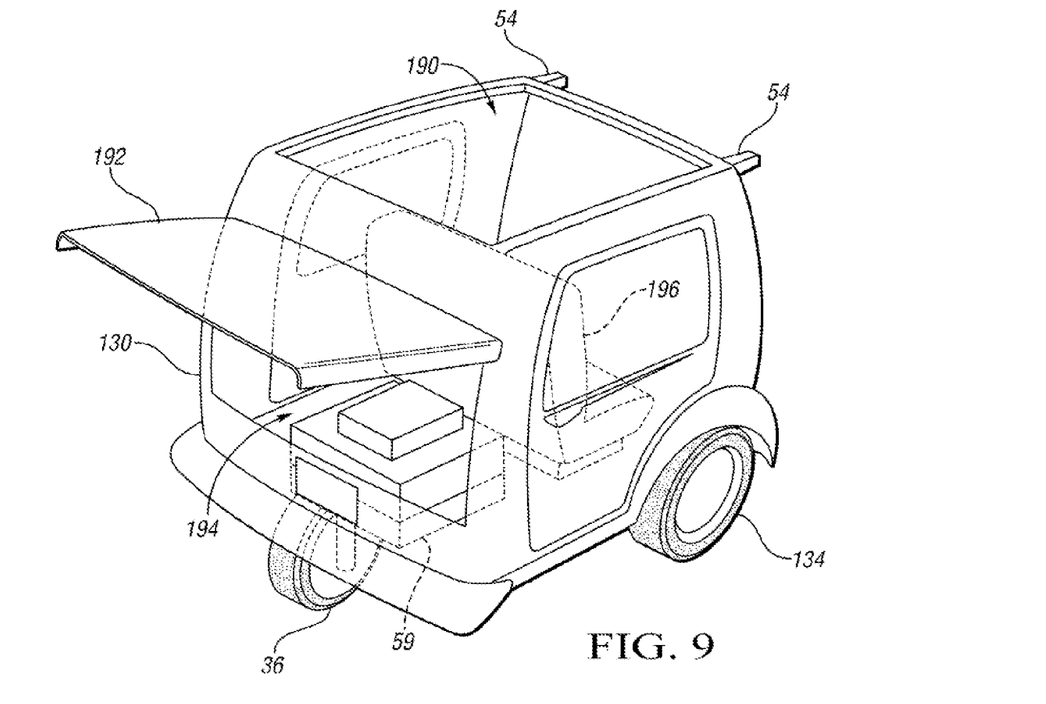
FIG. 9 is a schematic illustration in perspective view of the rear of the extension unit of FIG. 6.

In FIGS. 6 and 9 it is apparent that the roof portion 49 has a central opening 190 that is covered by the lift gate 40 when the lift gate 40 contacts the roof portion 49. The central opening 190 helps to reduce the weight of the extension unit 114. The extension unit 114 has a second body 130 slightly different from the body 30 of the extension unit 14 at least in that the wheels 134 are spaced slightly closer to the front of the extension unit 114 than wheels 34 of the extension unit 14. As shown in FIG. 9, the extension unit 114 has a rear hatch 192 to permit access to the cargo area 194 behind the bench seat 196 of the extension unit 114. The extension unit 114 thus has two side doors and the rear hatch 192. When the extension unit 114 is attached to the drivable vehicle, it provides increased speed, range, storage and passenger seating.

Figure 12:
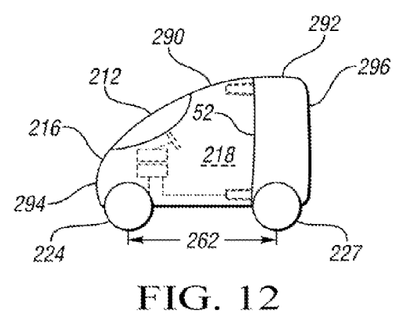
FIG. 12 is a schematic side view illustration of a third embodiment of a drivable vehicle having a front portion attached to a rear portion.
Figure 13:
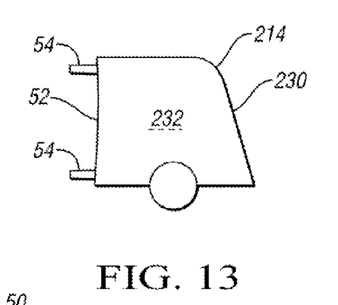
FIG. 13 is a schematic side view illustration of a third embodiment of an extension unit for attachment to the front portion of the drivable vehicle of FIG. 12.
Figure 14:
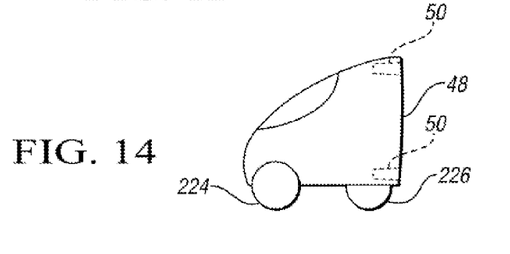
FIG. 14 is a schematic side view illustration of the front portion of the drivable vehicle of FIG. 12 with the rear portion detached.
Figure 15:
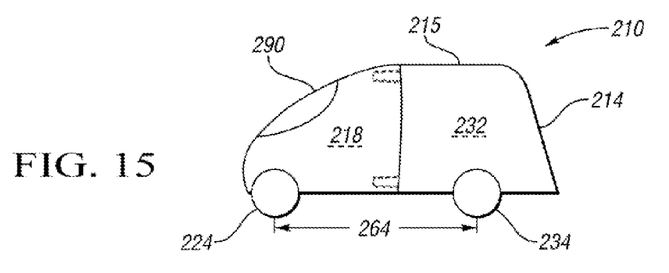
FIG. 15 is a schematic side view illustration of a third embodiment of an expanded vehicle having the front portion of the drivable vehicle of FIGS. 12 and 14 attached to the extension unit of FIG. 13.

FIGS. 12 through 15 show another embodiment of an expandable vehicle system 210, shown as an expanded vehicle 215 in FIG. 15. FIG. 12 shows a drivable vehicle 212 and FIG. 13 shows an extension unit 214, both of which are included in the expanded vehicle system 210. Unlike the drivable vehicles 12 and 112, the drivable vehicle 212 includes a front portion 290 and a detachable rear portion 292. The front portion 290 includes front wheels 224 as well as a pivotable rear wheel 226 shown in FIG. 14. The rear wheel 226 may be used to balance the front portion 290 when the rear portion 292 is detached. For simplicity in the drawings, the rear wheel 226 is not shown in phantom in its pivoted position in FIGS. 12 and 15, but it would be stowed similar to wheel 26 shown in a stowed position 60 in FIGS. 2 and 10. Although illustrated as being approximately the same size as front wheels 224, the rear wheel 226 may instead be smaller or larger than front wheels 224. The front portion 290 includes a first portion 294 of the first body 216. The rear portion 292 includes a second portion 296 of the first body 216 as well as a pair of rear wheels 227. Together, the front portion 290 and the rear portion 292 define a first interior compartment 218.

As shown in FIG. 14, the front portion 290 has the first attachment interface 48 with spaced cavities 50 described with respect to FIG. 1. The rear portion 292 has the second attachment interface 52 with extension posts 54 at a predetermined spacing as discussed with respect to FIG. 1. The first attachment interface 48 includes the shaped projections 56 as shown in FIG. 4 and the second attachment interface 52 includes the shaped recesses 58 that receive the projections 56 and couple the front portion 290 to the rear portion 292.

The extension unit 214 has a second body 230 defining and partially enclosing a second interior space 232. The extension unit 214 has a duplicate second attachment interface 52 with extension posts 54 at the predetermined spacing, as well as the shaped recesses 58. If the extension unit 214 includes a second propulsion system similar to the second propulsion system 59 of FIG. 1, then at least one of the posts 54 may include the electrical interface 57 with a CAN bus 61 and control bus 63. The extension unit 214 also has a pair of wheels 234, one of which is visible in FIG. 13.

When a relatively small, fuel efficient vehicle is needed, the drivable vehicle 212 can be used. When additional passenger seating is desired, or additional range or performance (if the extension unit 214 has a second propulsion system), then the rear portion 292 is removed from the front portion 290 and the extension unit 214 is attached to the front portion 290. Because both the rear portion 292 and the extension unit 214 have the same second attachment interface 52, the extension unit 214 is mechanically-coupled to the front portion 290 to form the expanded vehicle 215 of FIG. 15. The portion of the first interior space 218 that is defined by the front portion 290 is then contiguous with the second interior space 232 of the extension unit 214. When the rear portion 292 is coupled to the front portion 290, the drivable vehicle 212 has a first wheel base 262 between the wheels 224 and the wheels 227. When the extension unit 214 is coupled to the front portion 290, the expanded vehicle 215 has a second wheel base 264 between the wheels 224 and the wheels 234. The second wheel base 264 is longer than the first wheel base 262.

Figure 16:
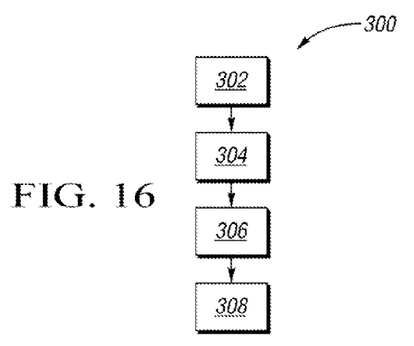
FIG. 16 is a flow diagram of a method of expanding a vehicle.

FIG. 16 is a flow diagram of a method 300 of expanding a vehicle that may be used with any of the drivable vehicles 12, 112, 212 shown and described. The method 300 is described with respect to the vehicle 112. The method 300 begins with block 302, in which the first body 16 of the drivable vehicle 112 is attached to the second body 130 of the extension unit 114 to form an expanded vehicle 115 with the interior compartment 18 of the drivable vehicle 112 contiguous with the interior compartment 32 of the extension unit 114. The vehicle user can then drive the expanded vehicle 115 in block 304 of the method 300. If the vehicle user has different vehicle needs on a subsequent excursion, the second body 130 of the extension unit 114 can be detached from the first body 16 in block 306. The drivable vehicle 112 can then be driven in block 308 when the extension unit 114 is detached.

Figure 17:
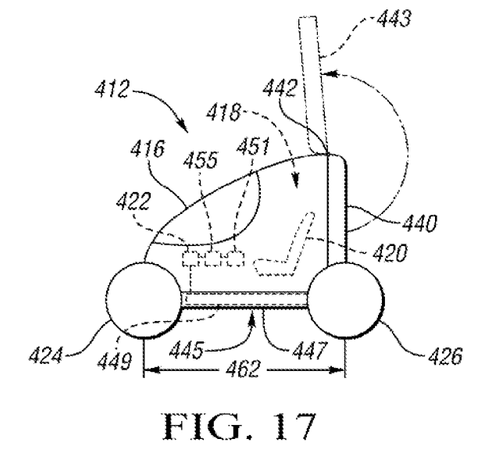
FIG. 17 is a schematic illustration of a fourth embodiment of a drivable vehicle having an expandable chassis.
Figure 18:
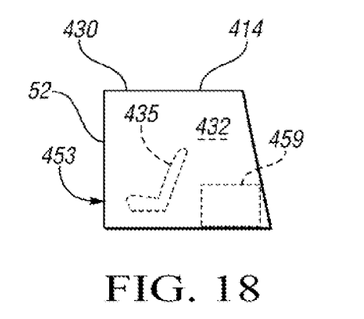
FIG. 18 is a schematic illustration of a fourth embodiment of an extension unit for attachment to the drivable vehicle of FIG. 17.
Figure 19:
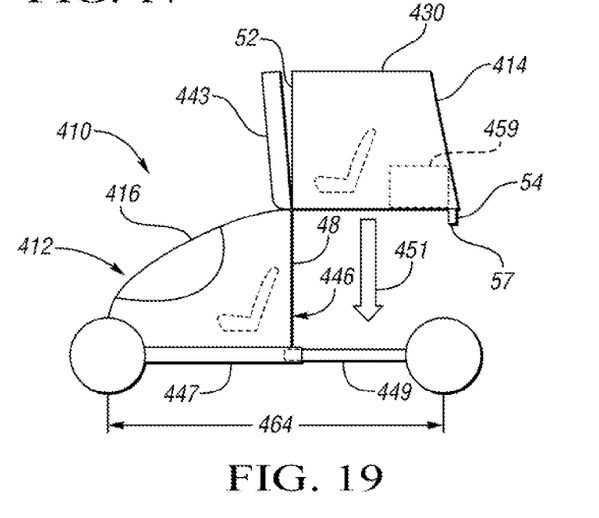
FIG. 19 is a schematic illustration of the drivable vehicle of FIG. 17 with the chassis expanded.
Figure 20:
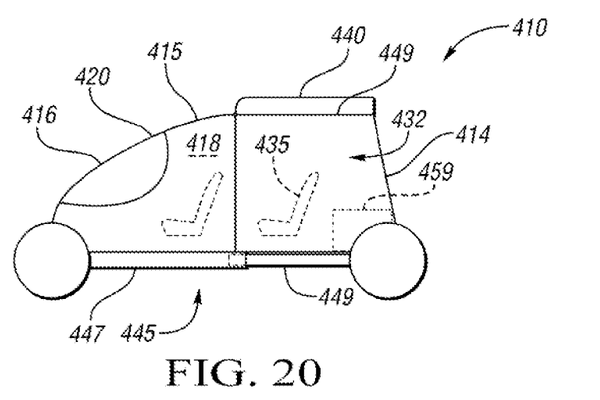
FIG. 20 is a schematic illustration of an expanded vehicle with the extension unit attached to the drivable vehicle.

FIGS. 17-20 show another embodiment of an expandable vehicle system 410 that includes a drivable vehicle 412 that is drivable as a relatively compact, stand-alone vehicle, and is selectively attachable to an extension unit 414 to form an expanded vehicle 415 as shown in FIG. 20. As shown in FIG. 17, the drivable vehicle 412 has a first body 416 that defines and encloses a first interior compartment 418. The extension unit 414 has a second body 430 that defines a second interior compartment 432. The drivable vehicle 412 has a lift gate 440 connected to the remainder of the body 416 at a hinge 442. The lift gate 440 is shown closed in FIG. 17 as well as moved to an open position 443 in phantom shown in phantom.

The drivable vehicle 412 has a chassis 445 to which the body 416 is mounted. Front wheels 424 and rear wheels 426 are also connected to the chassis 445. The chassis 445 is configured with a first rail 447 and a second rail 449 configured to be nestable at least partially within the first rail 447. The front wheels 424 are connected to the first rail 447, and the rear wheels 426 are connected to the second rail 449. In the side view shown, only one front wheel 424, one first rail 447, one second rail 449 and one second wheel 426 are shown. It should be understood that a duplicate front wheel, 424, first rail 447, second rail 449, and second wheel 426 are connected on the opposite side of the chassis 445.

The second rail 449 can be selectively slid outward of the front rail 447 to expand the chassis 445 so that the wheel base between the front wheels 424 and the rear wheels 426 expands from a first wheel base 462 shown in FIG. 1 to a second wheel base 464 shown in FIG. 19. One or more locking mechanisms (not shown) lock the second rail 449 to the first rail 447 in either the nested position of FIG. 17 or the extended position of FIG. 19.

With the chassis expanded as shown in FIG. 19, the extension unit 414 can be attached to the first body 416. The first body 16 has the first attachment interface 48 at least partially surrounding an opening 446 that is exposed when the lift gate 440 is in the open position 443. The second body 430 has the attachment interface 52 at least partially surrounding an opening 453 of the second body 430 that faces the opening 446 in FIG. 19. The attachment interfaces 48, 52 are connected when the extension unit 414 is lowered onto the extended chassis 445 in the direction of arrow 451 as shown in FIG. 19. The extension unit 414 may have at least one extension post 54 that is received in a cavity (not shown) formed in the chassis rail 449, or may have other attachment mechanisms to secure the extension unit 414 to the chassis 445. Once the extension unit 414 is positioned on the chassis 445 as shown in FIG. 20, the lift gate 440 is lowered to a second position in which it mates to the roof portion 449 of the extension unit 414, either by using additional attachment interfaces 48, 52 or any other attachment mechanism. In the expanded vehicle 415, the first interior compartment 418 is contiguous with the second interior compartment 432 due to the adjacent openings 446, 453. The expanded vehicle 415 includes the seats of the drivable vehicle 412, such as seat 420, as well as any seats of the extension unit 414, such as seat 435. A first propulsion system 422 of the drivable vehicle 416 can be used to drive the expanded vehicle 415.

Optionally, the extension unit 414 may have a second propulsion system 459 that can be operatively connected with the first propulsion system 422 as well as with a control system 451 and an electrical system 455 of the drivable vehicle 412 through an electrical interface 57 of the extension post 54 as described with respect to FIG. 8. Connecting wires (not shown) may extend from the first propulsion system 422 and the control system 451 and electrical system 455 to the second propulsion system 459 through the rails 447, 449 to the electrical interface 57 of the extension post 54.

When the larger seating capacity and interior compartment of the expanded vehicle 415 is no longer needed, the extension unit 414 can be detached from the first body 416 and the chassis 445, and the second rail 449 can be slid to the nested position of FIG. 17 (within the first rail 447) to reestablish the first wheel base 462. The drivable vehicle 412 can then be operated without the extension unit 414.

The expandable vehicle systems 10, 110, 210, 410 described herein provide flexible mobility solutions to meet different mobility needs arising on different occasions. By way of non-limiting example, the fuel efficient drivable vehicle 12, 112, 212, 412 can be used when a single passenger or a few passengers must travel a relatively short distance. If more passengers or cargo needs to be transported, or if a further trip or a trip requiring more power or speed is planned, the extension unit 14, 114, 214, 414 can be attached.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An expandable vehicle system comprising:
a drivable vehicle having a first propulsion system, a first set of wheels, and a first body supported by the first set of wheels; wherein the first body at least substantially encloses and defines a first interior compartment;
an extension unit having a second body and at least one wheel supporting the second body; wherein the second body at least partially defines a second interior compartment;
wherein the first body is configured with a first attachment interface and the second body is configured with a second attachment interface; wherein the first and second attachment interfaces are cooperatively configured to attach to one another such that the drivable vehicle is mechanically-coupled to the extension unit to form an expanded vehicle drivable by the drivable vehicle and with the first interior compartment contiguous with the second interior compartment;
wherein the first body defines an opening and has a closure panel that is movable between a closed position and an open position; wherein the closure panel closes the opening to at least partially enclose the first interior compartment when in the closed position; wherein the closure panel permits access to the first interior compartment through the opening when in the open position; wherein the closure panel and the second body are cooperatively configured such that the closure panel mates to the second body to at least partially enclose the second interior compartment when the closure panel is in the open position; and
wherein one of the first attachment interface and the second attachment interface is configured to be at least partially openable to receive the other of the first attachment interface and the second attachment interface and to close around the other of the first attachment interface and the second attachment interface when the other of the first attachment interface and the second attachment interface is received.

2. The expandable vehicle system of claim 1, wherein the closure panel is a lift gate that mates to the second body at a roof portion of the second body.

3. The expandable vehicle system of claim 1, wherein the closure panel seals to the second body when the closure panel mates to the second body.

4. The expandable vehicle system of claim 1, wherein one of the first body and the second body includes extension posts having a predetermined spacing and extending generally in a longitudinal direction;
wherein the other of the first body and the second body defines cavities having the predetermined spacing; and
wherein the cavities are configured to receive the posts.

5. The expandable vehicle system of claim 4, further comprising:
a weather seal mounted to one of the first and the second bodies; and
wherein the weather seal seals the contiguous first interior compartment and second interior compartment when the attachment interfaces are attached to one another; and further comprising:
pressure sensors mounted on at least one of the first body and the second body and operable to determine pressure on the attached first and second bodies.

6. The expandable vehicle system of claim 4, wherein the extension posts are tapered and are configured to be wedged into the cavities.

7. The expandable vehicle system of claim 4, wherein the extension unit has a second propulsion system; and wherein the first propulsion system is connected to the second propulsion system through the posts when the posts are received in the cavities so that the expanded drivable vehicle has a greater driving range than the extension unit.

8. The expandable vehicle system of claim 1, wherein said one of the first attachment interface and the second attachment interface forms an additional cavity, and further comprising:
a locking mechanism configured to be inserted into the additional cavity when the other of the first attachment interface and the second attachment interface is inserted into said one of the first attachment interface and the second attachment interface, thereby preventing said one of the first attachment interface and the second attachment interface from opening and securing the drivable vehicle to the extension unit.

9. The expandable vehicle system of claim 1, wherein the first and second bodies are configured to provide at least one of electrical connectivity and control system connectivity between the drivable vehicle and the extension unit when the first and second bodies are attached to one another.

10. The expandable vehicle system of claim 1, wherein the drivable vehicle has a first vehicle seat in the first interior space; and wherein the extension unit has a second vehicle seat in the second interior space.

11. The expandable vehicle system of claim 1, wherein the first set of wheels includes front wheels and at least one rear wheel defining a first wheel base; and wherein said at least one rear wheel is configured to pivot to a stowed position such that the expanded drivable vehicle is supported only by the front wheels and said at least one wheel supporting the second body, the expanded drivable vehicle thereby having a second wheel base longer than the first wheel base.

12. The expandable vehicle system of claim 1, wherein the extension unit includes at least one of a vehicle seat and a second propulsion system.

13. The expandable vehicle of claim 1, further comprising:
a rear access light on the closure panel configured to be viewable from a rear position both when the closure panel is in the closed position and when the closure panel is in the open position.

14. An expandable vehicle system comprising:
a first vehicle body defining and at least partially enclosing a first interior compartment;
a second vehicle body defining and at least partially enclosing a second interior compartment;
at least one wheel supporting the second vehicle body;
wherein the first vehicle body defines an opening and has a closure panel that is movable between a closed position and an open position; wherein the closure panel closes the opening to at least partially enclose the first interior compartment when in the closed position; wherein the closure panel permits access to the first interior compartment through the opening when in the open position; wherein the closure panel and the second body are cooperatively configured such that the closure panel mates to the second body to at least partially enclose the second interior compartment when the closure panel is in the open position;
wherein the first vehicle body has an attachment interface configured for mechanical attachment to the second vehicle body when the closure panel is in the open position to expand a wheel base partially defined by said at least one wheel.

16. The expandable vehicle system of claim 14, wherein the attachment interface at least partially surrounds the opening; and wherein said at least one wheel is a rear wheel that is pivotable to a stowed position in which said at least one wheel does not support the second vehicle body.

16. A method of expanding a vehicle comprising:
  raising a closure panel of a first body of a drivable vehicle to open an interior compartment of the first body;
  mating the raised closure panel to a second body of an extension unit supported on at least one wheel;
  attaching the first body to the second body of the extension unit to form an expanded vehicle that has the interior compartment of the first body contiguous with an interior compartment of the extension unit and so that rear lights on the closure panel are visible.

17. The method of claim 16, further comprising:
  driving the expanded vehicle with the first body attached to the second body;
  detaching the second body from the first body; and
  driving the drivable vehicle after detaching the second body.

\* \* \* \* \*